Patented June 2, 1931

1,808,168

UNITED STATES PATENT OFFICE

MARION B. HOPKINS, OF ELIZABETH, NEW JERSEY, ASSIGNOR TO STANDARD OIL DEVELOPMENT COMPANY, A CORPORATION OF DELAWARE

DEHYDROGENATING HYDROCARBONS

No Drawing.    Application filed July 31, 1923.    Serial No. 654,947.

This invention relates to the art of dehydrogenating hydrocarbons, and will be fully understood from the following description.

In the customary practice of preparing unsaturated hydrocarbons, a saturated hydrocarbon stock is subjected to heat of sufficient degree to cause more or less widespread pyrolytic decomposition. A considerable loss is incurred through the formation of many undesired compounds, also carbon, and the carbon introduces difficulties through coking up the apparatus and necessitating interruption in the run for allowing necessary cleaning. Moreover the stock used must be selected of higher carbon atom number per molecule than the product in view, and it is difficult to control the extent of cracking down to just the point necessary to secure the maximum yields of the products expected.

In accordance with the present invention, instead of pyrolytically decomposing hydrocarbons of higher carbon atom number, I proceed to remove hydrogen to the extent desired from hydrocarbons of the general range of the final product intended, and I have discovered that each hydrocarbon has its own optimum treating temperature, the temperature varying inversely with the molecular weight or boiling point, or more explicitly the structure. That is, the lower hydrocarbons require a higher treating temperature than those of higher carbon atom number, or structure. For example, propane is treated best at about 440° C., butane at about 410° C., and on up the series; the optimum treating temperature becoming lower and lower, by slightly decreasing differentials. This feature becomes of very great importance where it is desired to treat mixtures of hydrocarbons, as with a knowledge of the boiling curve or the constituents of the mixture it immediately becomes possible to treat the mixture rationally. As hydrogen-removing agent I use oxygen, either pure or with a diluent as desired, ordinarily air being the most convenient form. According to the amount and manner of supplying the oxygen, the dehydrogenation can be carried to any extent desired, and compounds with one double bond or more than one can be produced.

For the production of compounds having one double bond the amount of oxygen required may be figured as one atom per hydrocarbon molecule. Generally, however, unless the apparatus is very efficient as regards securing of proper mixture, it is well to allow a slight surplus, as for example 1½ atoms of oxygen per hydrocarbon molecule. If more than one double bond per molecule is to be had, the amount of oxygen must be figured accordingly, and in this case also sufficient diluents should be provided to keep down polymerization, and the operating pressure advisably will be maintained low; as diluents, inert gases, steam, etc., may be used.

All of the oxygen may be introduced at once or the oxygen feed may be divided over several successive points of introduction in the treating apparatus. The latter procedure is generally preferable as it facilitates close temperature control.

In starting, the apparatus is initially heated to the proper temperature. If tubes are used this heating may be done by electric means or by furnace heat. If a refractory checker-like chamber be used it may be brought up to temperature by suitable heating flues, or by an initial combustion blast somewhat as in gas practice. Generally I prefer the tubes, as allowing a smoothly operating continuous process, and I arrange the hydrocarbon feed at the end and the oxygen or air feed inlets at intervals along the tubes. After the reaction is started, the heat produced is such that if external heat is required it is necessary only as a deficiency make-up to be used regulatively. Where air is fed at successive intervals along the tubes, it is in some cases advantageous, by reason of the increasing dilution from the accumulating nitrogen, to use pure oxygen at the final feed points.

Operating pressures ordinarily will be in the neighborhood of atmospheric, although in some cases, if desired, higher pressures may be used, or in some cases, as for instance with high molecular compounds and in the production of compounds having more than one double bond, lower pressures may be used.

The hydrocarbon is preferably introduced into the treating chamber in vapor phase, or at least it should vaporize shortly after introduction, to get good results.

In treating propane, for example, to prepare propylene, the gas is subjected to heat at a temperature of 440° C., or at least between 410° and 470° C., and air is supplied in the proportion of about 2 or 3 parts, conveniently 2.5 parts by volume, to each part of hydrocarbon. By introducing the air at successive points the temperature may be regulated more exactly. In treating butane, the temperature is maintained at about 410° C., or at least between 380° and 440° C. At natural gas gasoline plants, various mixtures of propane, etc., or butane, etc., are available, such as vent gases, etc., and these can be readily determined as to composition and treated in accordance with my invention; the temperature in the first zone being gauged for the highest hydrocarbon constituent and graduated up for the successively lower hydrocarbons in the series to be affected. In dehydrogenating a mixture of hydrocarbons such as the gasoline fraction of a petroleum distillate, I ordinarily start the reaction at about 265° C. and maintain gradually increasing temperature zones throughout the length of the reaction chamber. In treating a mixture of hydrocarbons such as the kerosene fraction, the temperature of the first zone will be correspondingly lower than that of the first zone for the lighter gasoline hydrocarbons. In general, when treating kerosene stock, the temperature may increase progressively from about 250° C. to about 400° C. The temperature range usually employed, according to this invention, is between 250° C. and 470° C.

While I have described my invention by reference to certain illustrative details, it will be understood that changes may be made which come within the spirit and scope of the invention.

I claim:

1. A process for partially dehydrogenating hydrocarbons, comprising causing the hydrocarbons as vapors to traverse an elongated path in admixture with free oxygen, heating the admixture of hydrocarbon vapors and oxygen to a temperature between 250° C. and 470° C., the quantity of oxygen being so limited as to partially dehydrogenate the hydrocarbons, thereby forming unsaturated compounds without substantial quantities of compounds containing the three elements, carbon, hydrogen and oxygen, and withdrawing the unsaturated product.

2. A process according to claim 1 in which a gas containing free oxygen is admitted to the dehydrogenation zone in proportion of about 1 atom of oxygen for every two atoms of hydrogen to be removed from the hydrocarbon.

3. A process according to claim 1 in which about 1½ atoms of oxygen are admitted to the dehydrogenation zone for each hydrocarbon molecule heated.

4. A process according to claim 1 in which air is admitted to the dehydrogenation zone at a plurality of points.

5. A process for selectively dehydrogenating a mixture of saturated hydrocarbons, comprising passing the hydrocarbon mixture in vapor form through a plurality of dehydrogenation zones at progressively higher temperatures between 250 and 470° C., supplying gas containing free oxygen to pass in admixture with the hydrocarbon vapors through each zone, the quantity of oxygen being so limited as to partially dehydrogenate the hydrocarbons, thereby forming unsaturated compounds without substantial quantities of compounds containing the three elements, carbon, hydrogen, and oxygen, and withdrawing the unsaturated product.

6. A process according to claim 5 in which the quantity of oxygen supplied to each zone is not greater than 1 atom of oxygen for each two atoms of hydrogen to be removed in each zone.

7. A process according to claim 5 in which air is supplied to the dehydrogenation zones at a plurality of points.

MARION B. HOPKINS.